(12) United States Patent
Okamoto et al.

(10) Patent No.: US 10,696,893 B2
(45) Date of Patent: Jun. 30, 2020

(54) PERFORATION BALLS AND METHODS OF USING THE SAME

(71) Applicant: FracSolution Technologies, LLC, Houston, TX (US)

(72) Inventors: Kelvin T. Okamoto, Carmel, IN (US); Dwight Smith, Murrieta, CA (US); Billy Bennett, Duncan, OK (US)

(73) Assignee: FracSolution Technologies, LLC, Houston, TX (US)

( * ) Notice: Subject to any disclaimer, the term of this patent is extended or adjusted under 35 U.S.C. 154(b) by 0 days.

(21) Appl. No.: 15/281,199

(22) Filed: Sep. 30, 2016

(65) Prior Publication Data
US 2017/0210976 A1   Jul. 27, 2017

Related U.S. Application Data

(60) Provisional application No. 62/236,768, filed on Oct. 2, 2015.

(51) Int. Cl.

| | |
|---|---|
| *E21B 43/267* | (2006.01) |
| *C09K 8/68* | (2006.01) |
| *C09K 8/64* | (2006.01) |
| *C09K 8/72* | (2006.01) |
| *C09K 8/80* | (2006.01) |
| *C09K 8/524* | (2006.01) |
| *C09K 8/528* | (2006.01) |
| *C09K 8/60* | (2006.01) |
| *C09K 8/70* | (2006.01) |
| *C09K 8/92* | (2006.01) |
| *E21B 33/138* | (2006.01) |
| *E21B 43/26* | (2006.01) |

(52) U.S. Cl.
CPC ............... *C09K 8/68* (2013.01); *C09K 8/524* (2013.01); *C09K 8/528* (2013.01); *C09K 8/605* (2013.01); *C09K 8/64* (2013.01); *C09K 8/703* (2013.01); *C09K 8/725* (2013.01); *C09K 8/805* (2013.01); *C09K 8/92* (2013.01); *E21B 33/138* (2013.01); *E21B 43/26* (2013.01); *E21B 43/267* (2013.01); *C09K 2208/12* (2013.01); *C09K 2208/26* (2013.01)

(58) Field of Classification Search
None
See application file for complete search history.

(56) References Cited

U.S. PATENT DOCUMENTS

| | | | | |
|---|---|---|---|---|
| 2008/0093073 | A1* | 4/2008 | Bustos | C09K 8/68 166/279 |
| 2008/0135242 | A1* | 6/2008 | Lesko | C09K 8/665 166/268 |
| 2010/0200235 | A1* | 8/2010 | Luo | C09K 8/50 166/284 |
| 2012/0157358 | A1* | 6/2012 | Fang | C04B 38/0061 507/269 |
| 2013/0206408 | A1* | 8/2013 | Chatterjee | C04B 33/1352 166/280.1 |
| 2014/0209393 | A1* | 7/2014 | Jamison | E21B 21/00 175/217 |
| 2017/0159402 | A1* | 6/2017 | Nelson | C09K 8/426 |
| 2017/0166798 | A1* | 6/2017 | Okamoto | E21B 43/267 |

* cited by examiner

*Primary Examiner* — Andrew Sue-Ako
(74) *Attorney, Agent, or Firm* — Wolf, Greenfield & Sacks, P.C.

(57) ABSTRACT

Perforation balls and methods of using the same are described herein. The perforation balls include at least a portion that is water dissolvable.

18 Claims, No Drawings

PERFORATION BALLS AND METHODS OF USING THE SAME

RELATED APPLICATIONS

This application claims priority to U.S. Provisional Application No. 62/236,768, filed Oct. 2, 2015, which is incorporated herein by reference in its entirety.

FIELD

The invention relates to perforation balls and methods of using the same (e.g., in hydrocarbon recovery processes).

BACKGROUND

Perforation balls may be used in hydrocarbon (e.g., oil, gas) recovery processes as an aid in fracturing operations. For example, perforation balls can be used in an initial fracturing operation or in a re-fracturing operation in which an already fractured well is re-fractured to increase capacity. Perforation balls can be a temporary blocking agent that stops the flow through existing fractures so that those fractures are not lengthened or do not interfere in the generation of new or additional fractures.

SUMMARY

Perforation balls and methods of using the same are described herein.

In one aspect, a method is provided. The method comprises introducing a solution comprising perforation balls into a hydrocarbon wellbore. The perforation balls include at least a portion that is water dissolvable.

In another aspect, perforation balls are provided. The perforation balls are designed to be introduced into a hydrocarbon wellbore. The perforation balls include at least a portion that is water dissolvable.

Other aspects, features and embodiments are described further below.

DETAILED DESCRIPTION

Perforation balls and methods of using the same are described herein. The perforation balls include at least a portion that is water dissolvable. In some embodiments, the perforation balls are entirely water dissolvable. For example, the perforation balls may comprise a water dissolvable polymer (e.g., polyvinyl alcohol). As described further below, the perforation balls may be used in hydrocarbon (e.g., oil, gas) recovery processes (e.g., hydraulic fracturing and re-fracturing methods). For example, during use, the perforation balls may be introduced into a wellbore and can effectively block fractures. After a period of time, the perforation balls dissolve (at least in part and, in some cases, entirely) in water, thus, allowing the hydrocarbon (e.g., oil or gas) to pass through the fractures into the wellbore from which it may be recovered.

In some embodiments, the perforation balls are entirely water dissolvable. In some embodiments, the perforation balls are only partially water dissolvable. The perforation balls may comprise a single component (e.g., a single composition) which is water dissolvable. In some embodiments, the perforation balls comprise multiple components at least one of which is water dissolvable. In some multi-component embodiments, more than one component and/or all components are water dissolvable. In some cases, the perforation balls comprise a layer formed on a core. In some cases, the perforation balls comprise multiple layers. In some embodiments, the water dissolvable portion(s) of the perforation ball may be at least 25% by weight of the perforation ball; in some cases, at least 50% by weight; in some cases, at least 75% by weight; in some cases, at least 90% by weight; in some cases, at least 95% by weight; and, in some cases, at least 99% by weight.

The term "water dissolvable" refers to a material that substantially dissolves in water at use temperatures and also refers to polymers that depolymerize or react in water at use temperatures with the resultant byproducts being soluble in water. In some embodiments, the water dissolvable portion of the perforation ball (e.g., the entire perforation ball) dissolves in water at temperatures (i.e., the use temperature) between 10° C. to 125° C.; in some embodiments, the water dissolvable portion dissolves in water at temperatures between 10° C. to 40° C.; and in some embodiments, the water dissolvable portion dissolves in water at temperatures between 60° C. to 110° C.

In some embodiments, the perforation balls may also include a portion that is biodegradable in water. Water biodegradability can be determined using standard test methods of ASTM, CEN, ISO or other accepted standards bodies. In general, biodegradability is determined in water by having over 90% of the organic carbon converted to carbon dioxide or methane within one year in the biodegradation environment. In some embodiments, the perforation balls are entirely water biodegradable. In some embodiments, the perforation balls are only partially water biodegradable.

The perforation balls may comprise a polymer. Suitable water dissolvable polymers include polyvinyl alcohol (PVOH), polyglycolic acid (PGA), and polytrimethylene terephthalate (PTT). Water dissolvable polymers that depolymerize or react in water to produce byproducts that are soluble in water at use temperatures include many thermoplastic polyesters and polyamides, such as polylactic acid (PLA), polybutylene succinate (PBS), polybutylene adipate terephalate (PEAT)) and polybutylene adipate succinate (PBAS). Polyvinyl acetate (PVA) is an example of a polymer that reacts in water at use temperatures to produce water soluble byproducts. It should be understood that the water dissolvable materials may also be blended in any combination to produce a water dissolvable layer for the perforation balls.

In general, suitable polymers may be a thermoplastic that is produced from any combination of monomers or low molecular weight precursors that can produce a water dissolvable polymer. The polymers can be produced by any chemical means known such as a condensation reaction or a radical polymerization with and without catalysts in both instances. The thermoplastic polymer or combination of thermoplastic polymers may be among amorphous, semicrystalline or crystalline polymers. The polymers may also be virgin, scrap, post-industrial recycled or post-consumer material.

In some embodiments, it may be preferred that the perforation ball comprises polyvinyl alcohol (PVOH). In some embodiments, the perforation balls consist essentially of PVOH. The perforation balls may comprise a copolymer that comprises polyvinyl alcohol or a blend comprising polyvinyl alcohol. In some embodiments, the perforation balls comprise a blend of polyvinyl alcohol and copolymers thereof.

Polyvinyl alcohols can have atactic, isotactic, heterotactic and syndiotactic stereospecificity. Changes in the stereospecificity of polyvinyl alcohol affect thermal resistance, crystallinity, melting point, the rate of water dissolvability and biodegradability. Polyvinyl alcohol comprises vinyl alcohol units and, in some embodiments, consists essentially of vinyl alcohol units. In some embodiments, PVOH is part of a co-polymer material that comprises PVOH and at least one other polymer type. There are no specific limitations with respect to the process for producing the polyvinyl alcohol used in the perforation balls described herein.

Polyvinyl alcohol may also be partially or fully functionalized to produce a polymer that is also water dissolvable. For example, PVOH may be reacted with acetic acid or an equivalent to produce polyvinyl acetate (PVA).

In some embodiments, the perforation balls comprise PLA. PLA can be prepared according to any method known in the state of the art. For example, PLA can be prepared from lactic acid and/or from one or more of D-lactide (e.g., a dilactone, or a cyclic dimer of D-lactic acid), L-lactide (e.g., a dilactone, or a cyclic dimer of L-lactic acid), meso D,L-lactide (e.g., a cyclic dimer of D- and L-lactic acid), and racemic D, L-lactide (e.g., racemic D,L-lactide comprises a 1/1 mixture of D- and L-lactide).

PLA can also be nucleated using mineral fillers or other polymers including highly stereospecific (e.g., >95% D) PLA polymers to dramatically increase the thermal resistance of PLA by having the material be semi-crystalline or crystalline rather than be amorphous.

In some embodiments, the perforation balls (and polymers) described herein may include other additives. For example, the perforation balls may include a compatibilizer that can be used to aid two or more polymers to mix together. Compatibilizers can also be binders to adhere the polymers or polymer blends to the mineral filler. As used herein, the term "compatibilizer" means a material that can provide blending between two or more polymers or between one or more polymers and mineral.

In another embodiment, the polymer compositions of the present disclosure can include formulations that are modified with one or more plasticizers, flow promoters, polymer processing aids, slip agents, viscosity modifiers, chain extenders, nanoparticles, spherical glass beads, organic fillers, inorganic fillers, fibers, colorants, anti-microbial agents and the like. The additional additives can be added to the polymer composition at any suitable time in the manufacturing process.

The plasticizers can be, for example, any suitable material that softens and/or adds flexibility to the materials to which they are added. For example, the plasticizers can soften the final product increasing its flexibility. Non-limiting examples of suitable plasticizers include, for example, polyethylene glycol, sorbitol, glycerine, soybean oil, caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bisoleamide, polymeric plasticizers such as poly(1,6-hexamethylene adipate) or combination thereof.

In some embodiments, the polymers include chair extenders. For example, the chain extenders can be oligomeric chain extenders. Preferred oligomeric chain extenders include styrene-acrylic copolymers or oligomers containing glycidyl groups incorporated as side chains. These materials are based on oligomers with styrene and acrylate building blocks that have desirable glycidyl groups incorporated as side chains. Some embodiments include a high number of epoxy groups per oligomer chain such as at least about 10; in some embodiments, greater than about 15; and, in some embodiments, greater than about 20. These polymeric materials may have a molecular weight greater than about 3000; in some embodiments, greater than about 4000; and, in some embodiments, greater than about 6000. Some examples are commercially available from Johnson Polymer, LLC under the JONCRYL® trade name such as JONCRYL® ADR 4368.

In some embodiments, the perforation balls (and polymers) described herein may include a filler. Non-limiting examples of organic fillers include wood flour, seeds, polymeric particles, ungelatinized starch granules, cork, gelatins, wood flour, saw dust, milled polymeric materials, agar-based materials, and the like. Examples of inorganic fillers include calcium carbonate, titanium dioxide, silica, talc, mica, sand, gravel, crushed rock, bauxite, granite, limestone, sandstone, glass beads, aerogels, xerogels, clay, alumina, kaolin, microspheres, hollow glass spheres, porous ceramic spheres, gypsum dihydrate, insoluble salts, magnesium carbonate, calcium hydroxide, calcium aluminate, magnesium carbonate, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and the like. A wide variety of other inorganic fillers may be added as starting materials to the polymeric materials including, for example, metals and metal alloys stainless steel, iron, and copper), balls or hollow spherical materials (such as glass, polymers, and metals), filings, pellets, flakes and powders (such as microsilica). The fillers may be produced through mining, refining or synthetically.

In some embodiments, the fillers are substantially insoluble in water. In other embodiments, the fillers are water dissolvable.

Non-limiting examples of fibers that may be incorporated into the polymer compositions include naturally occurring organic fibers, such as cellulosic fibers extracted from wood, plant leaves, and plant stems. These organic fibers can be derived from cotton, wood fibers (both hardwood or softwood fibers, examples of which include southern hardwood and southern pine), flax, abaca, sisal, ramie, hemp, and bagasse. In addition, inorganic fibers made from glass, graphite, silica, ceramic, rock wool, or metal materials may also be used.

Non-limiting examples of anti-microbial agents include metal-based agents such as zinc oxide, copper and copper compounds, silver and silver compounds, colloidal silver, silver nitrate, silver sulfate, silver chloride, silver complexes, metal-containing zeolites, surface-modified metal-containing zeolites or combination thereof. The metal-containing zeolites can include a metal such as silver, copper, zinc, mercury, tin, lead, bismuth, cadmium, chromium, cobalt, nickel, zirconium or a combination thereof. In another embodiment, the anti-microbial agents can be organic-based agents such as o-benzyl-phenol, 2-benzyl-4-chloro-phenol, 2,4,4'-trichloro-2'-hydroxydiphenyl ether, 4,4'-dichloro-2-hydroxydiphenyl ether, 5-chloro-2-hydroxy-diphenyl-methane, mono-chloro-o-benzyl-phenol, 2,2'-methylenbis-(4-chloro-phenol), 2,4,6-trichlorophenol or a combination thereof.

In some embodiments, the perforation balls (and, polymeric materials that form the perforation balls) may also comprise one or more additional chemicals. For example, the chemicals may be selected from the group consisting of: an antifouling agent, scale inhibitors, biocides, waxes, asphaltene, clay stabilizers, thickening agents, tracers, gel breakers or water migration inhibitors. In some embodiments, the additional chemical(s) are incorporated into one or more layer(s) of the perforation balls. In some embodiments, the additional chemical(s) may be encapsulated. For example, the encapsulated chemical may be incorporated in one or more layers of the perforation balls.

In one embodiment, the perforation balls may also include one or more typical process aids used in hydraulic fracturing, such as water thickeners, rust inhibitors and flow aids. The process aid may be in the coating of the perforation balls and would be released as the water dissolvable layer dissolves. Alternatively, the process aids may be encapsulated within a membrane or particle.

In some embodiments, the perforation balls have a density between 0.9 g/cc to 3.0 g/cc; in some embodiments, a density between 0.9 g/cc and 1.0 g/cc; in some embodiments, a density between 1.30 g/cc and 1.45 g/cc; in some embodiments, a density between 1.5 g/cc and 2.5 g/cc.

In some embodiments, (e.g., lower density perforation balls) the perforation balls may be foams (e.g., polymeric foams). For example, the perforation balls may be foamed by using chemical or physical blowing agents. Higher density perforation balls, for example, may be obtained through addition of fillers as mentioned above.

In general, the perforation balls are of any size diameter to perform sufficiently during use. In some embodiments, the perforation balls have a diameter from 6 mm to 32 mm. During use, perforation balls of different sizes may be used together.

Advantageously, the perforation balls described herein can be stable (e.g., thermally stable). For example, the perforation balls may be shelf stable to 60° C. In some cases, the perforation balls do not require temperature-controlled environments for shipping or use.

The perforation balls may be produced by any means known including compression molding, injection molding, and profile extrusion followed by machining.

As described above, the perforation balls may be used in hydrocarbon (e.g., oil, gas) recovery processes (e.g., hydraulic fracturing and re-fracturing methods). For example, during use, the perforation balls may be introduced into a wellbore. In some embodiments, the perforation balls are introduced into the wellbore along with a solution. In embodiments, it is preferable for the solution to be an aqueous solution. In other embodiments, the solution may be a non-aqueous solution. The solution may have a pH between 1-11 and, in some cases, the solution is acidic.

The perforation balls may be used (e.g., in hydraulic fracturing and re-fracturing processes) to temporarily block (i.e., plug) open fractures (including cracks, channels and the like). For example, the open fractures may be blocked to allow new fractures or to extend other unblocked fractures to be lengthened, branched or widened to increase the flow of hydrocarbon (e.g., oil, natural gas or other petroleum products) out of the well. After a time period, at least some of the water dissolvable portion(s) of the perforation balls (e.g., the entire perforation balls) dissolves to unplug the fractures.

The perforation balls may be added alone or in combination with standard proppants including uncoated and coated frac sand and coated and uncoated synthetic proppants (e.g. ceramic proppants). In some embodiments, as described further below, the perforation balls may be added with diversion sand.

In hydraulic fracturing, perforation balls may be used after the initial fracturing operation to allow more fracturing to occur, especially after a poor fracture in one or more well zones. In this case, all zones may be initially fractured or only some fractured before a zone is isolated for additional fracturing. To do this, the zone to be further fractured may be isolated by any means and the perforation balls sent downwell. The zone would then be further fractured by any means followed by the perforation balls dissolving. Standard proppant or diversion sand may be sent downwell before, during or after the perforation balls dissolution process. This process is repeated for all zones that require additional fracturing.

In a general embodiment, a method for fracturing or re-fracturing oil wells that uses perforation balls that are water dissolvable is provided wherein the perforation balls are added to the water solution injected into the well followed by the perforation balls plugging the fractures in the well bore. The well is then further fractured and the water dissolvable portion(s) of the perforation balls dissolve, at least in part, in the water solution injected into the well.

As noted above, the perforation balls may be used in combination with diversion sand. For example, the methods described herein may comprise introducing a solution comprising diversion sand into the wellbore before, during or after introducing the solution comprising perforation balls into the wellbore. The diversion sand may include particles that have a coating. The coating, for example, may comprise a water dissolvable layer. During use, the diversion sand may also be introduced into a wellbore and can effectively block fractures. After a period of time, the water dissolvable layer(s) of the diversion sand dissolve, thus, allowing the hydrocarbon (e.g., oil or gas) to pass through the fractures into the wellbore from which it may be recovered. In certain methods, the perforation balls may work to block certain fractures in the wellbore and the diversion sand may work to block other fractures in the wellbore.

Suitable diversion sand particles have been described, for example, in commonly-owned U.S. patent application Ser. No. 15/246,728, filed on Aug. 25, 2016. For example, suitable diversion sand particles can comprise a mineral (e.g., a natural mineral, a synthetic mineral), inorganic chemical, organic chemical or a polymeric material (e.g., a polymeric bead). Examples of suitable minerals include granite, sand, silica, limestone (e.g., dolomite), magnesium silicate, calcium carbonate, aragonite, talc, and quartz. Other potential suitable particle materials include zeolites. The minerals may be produced through mining, refining or synthetically. In some embodiments, the particles are substantially insoluble in water. In other embodiments, the particles are water dissolvable.

As noted above, the particles include a coating. The coating may include a single layer (e.g., the water dissolvable layer), in some embodiments. In other embodiments, the coating may include multiple layers. In multi-layer embodiments, the coating may include multiple water dissolvable layers (e.g., two or more water dissolvable layers that dissolve at different temperatures); or, a single water dissolvable layer in combination with one or more additional layers. In some embodiments, the coating includes one or more layer(s) that are not water dissolvable. In some embodiments, the water dissolvable layer is formed on one or more inner layer(s). The inner layer(s) may comprise a chemical for release after the water dissolvable layer has dissolved. For example, the chemical may be selected from the group consisting of: an antifouling agent, scale inhibitors, biocides, waxes, asphaltene, clay stabilizers, thickening agents, tracers, gel breakers or water migration inhibitors.

The water dissolvable layer may be formed of similar water dissolvable materials as described above in connection with the perforation balls. For example, in some cases, that it may be preferred that the water dissolvable layer comprises polyvinyl alcohol (PVOH).

In some embodiments, the diversion sand has a density of greater than 1.25 g/cc.

In general, the diversion sand has any suitable particle size to perform sufficiently during use. In some embodiments, the diversion sand has a particle size from 10 to 250 US mesh size; in some embodiments, the particle size is from 20 to 40 US mesh size; in some embodiments, the particle size is from 30 to 70 US mesh size; and in some embodiments, the particle size is from 100 to 250 US mesh size.

What is claimed is:

1. A method comprising:
    introducing a carrier fluid comprising perforation balls in combination with proppants into a hydrocarbon well, wherein the perforation balls include at least a portion formed of polyvinyl alcohol that is water dissolvable at temperatures between 60° C. and 110° C., wherein the weight percentage of polyvinyl alcohol in the perforation balls is at least 90%, and wherein the perforation balls have a diameter between 6 mm and 32 mm; and
    blocking fractures in the hydrocarbon well by plugging the fractures with the perforation balls.

2. The method of claim 1, wherein the carrier fluid is an aqueous solution.

3. The method of claim 1, wherein the carrier fluid is a non-aqueous solution.

4. The method of claim 1, wherein the carrier fluid is an acidic solution.

5. The method of claim 1, wherein the carrier fluid has a pH between 1-11.

6. The method of claim 1, further comprising re-fracturing the well to create additional fractures.

7. The method of claim 1, further comprising dissolving the water dissolvable portion formed of polyvinyl alcohol of the perforation balls to unplug the fractures.

8. The method of claim 1, wherein the hydrocarbon well is an oil well.

9. The method of claim 1, wherein the perforation balls are entirely water dissolvable.

10. The method of claim 1, wherein the perforation balls are only partially water dissolvable.

11. The method of claim 1, wherein the perforation balls are entirely water biodegradable.

12. The method of claim 1, wherein the perforation balls are partially water biodegradable.

13. The method of claim 1, wherein the perforation balls are shelf stable to 60° C.

14. The method of claim 1, wherein the perforation balls are shippable in non-refrigerated freight.

15. The method of claim 1, wherein the perforation balls have a density between 0.9 g/cc and 3.0 g/cc.

16. The method of claim 1, wherein the weight percentage of polyvinyl alcohol in the perforation ball is at least 95%.

17. The method of claim 1, wherein the perforation balls consist essentially of PVOH.

18. The method of claim 1, wherein the hydrocarbon well is a gas well.

* * * * *